(12) United States Patent
Maier et al.

(10) Patent No.: US 9,552,317 B2
(45) Date of Patent: Jan. 24, 2017

(54) APPARATUS AND METHOD FOR OPERATING AND SWITCHING A SINGLE CONDUCTOR INTERFACE

(71) Applicant: Fairchild Semiconductor Corporation, San Jose, CA (US)

(72) Inventors: Erik Maier, Scarborough, ME (US); John R. Turner, Portland, ME (US)

(73) Assignee: Fairchild Semiconductor Corporation, San Jose, CA (US)

( * ) Notice: Subject to any disclaimer, the term of this patent is extended or adjusted under 35 U.S.C. 154(b) by 435 days.

(21) Appl. No.: 14/057,245

(22) Filed: Oct. 18, 2013

(65) Prior Publication Data

US 2014/0115344 A1   Apr. 24, 2014

Related U.S. Application Data

(60) Provisional application No. 61/715,973, filed on Oct. 19, 2012.

(51) Int. Cl.
| | |
|---|---|
| *G06F 3/00* | (2006.01) |
| *G06F 13/40* | (2006.01) |
| *G06F 21/60* | (2013.01) |
| *H04L 1/16* | (2006.01) |
| *H04L 1/00* | (2006.01) |

(52) U.S. Cl.
CPC ............. *G06F 13/40* (2013.01); *G06F 21/602* (2013.01); *H04L 1/1692* (2013.01); *H04L 2001/0094* (2013.01)

(58) Field of Classification Search
CPC ....... G06F 13/40; G06F 21/602; H04L 1/1692
USPC .......................................................... 710/30
See application file for complete search history.

(56) References Cited

U.S. PATENT DOCUMENTS

| | | | |
|---|---|---|---|
| 5,982,996 A | 11/1999 | Snyders | |
| 7,406,100 B2 * | 7/2008 | Rocas | H04L 5/1446 370/503 |
| 2012/0074994 A1 * | 3/2012 | Zhong | H03L 7/0805 327/153 |

FOREIGN PATENT DOCUMENTS

| | | |
|---|---|---|
| CN | 103778091 A | 5/2014 |
| KR | 1020140050566 A | 4/2014 |
| TW | 201429206 A | 7/2014 |

OTHER PUBLICATIONS

"Chinese Application Serial No. 201310495490.2, Office Action mailed Jan. 22, 2016", w/ English Claims, 8 pgs.

* cited by examiner

*Primary Examiner* — Chun-Kuan Lee
(74) *Attorney, Agent, or Firm* — Schwegman Lundberg & Woessner, P.A.

(57) ABSTRACT

This application discusses, among other things, communication apparatus and methods, and more particularly, a single conductor or single wire communication scheme. In an example, a method for communicating between a master device and a slave device using a first single conductor can include transmitting a first ping on the first single conductor using a master device, the first single conductor configured to couple the master device to a slave device, receiving a slave ping on the first single conductor at the master device during a ping interval, toggling a logic level of the first single conductor prior to sending a first data packet using pulses having a duration of less than one half of a unit interval, such as a unit interval associated with a bit interval.

22 Claims, 13 Drawing Sheets

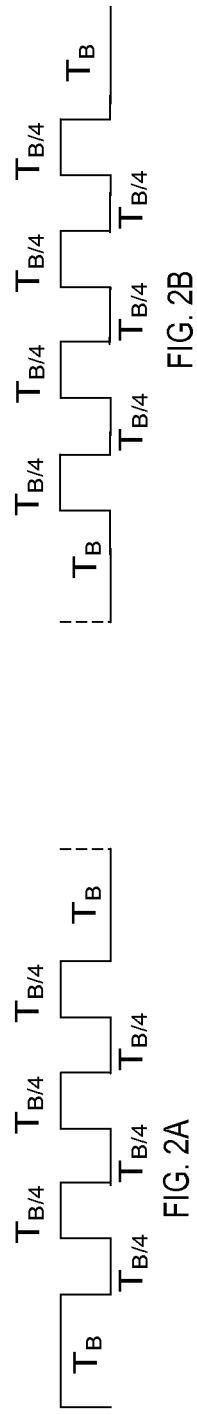

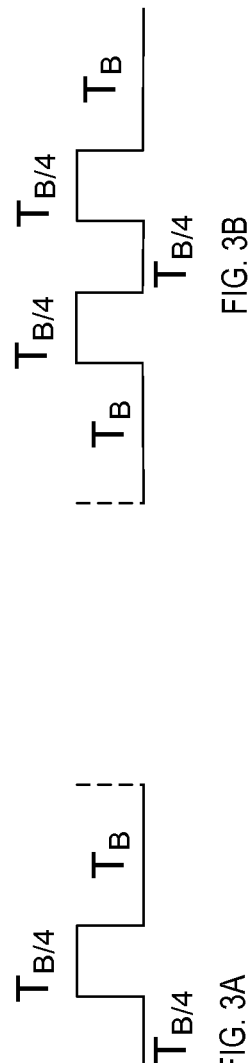
FIG. 3A
FIG. 3B
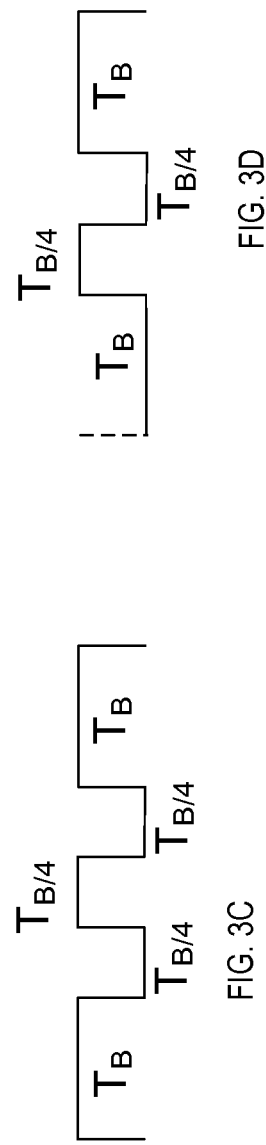
FIG. 3C
FIG. 3D

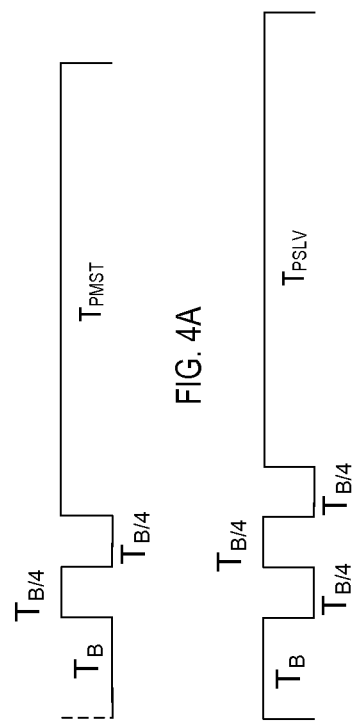

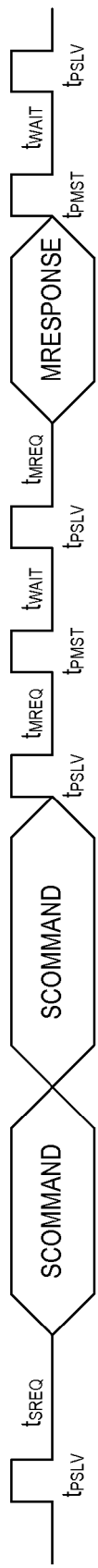
FIG. 6A
FIG. 6B

APPARATUS AND METHOD FOR OPERATING AND SWITCHING A SINGLE CONDUCTOR INTERFACE

CLAIM OF PRIORITY

This patent application claims the benefit of priority, under 35 U.S.C. Section 119(e), to Maier et al., U.S. Provisional Patent Application Ser. No. 61/715,973, entitled "APPARATUS AND METHOD OF OPERATING AND SWITCHING SINGLE WIRE INTERFACE," filed on Oct. 19, 2012, which is hereby incorporated by reference herein in its entirety.

BACKGROUND

There are many communication protocols for communicating between devices that are wired together. Many of these protocols rely on multi-conductor communication busses. However, certain conductors on the bus are often idle providing an opportunity for additional communications to be conducted on the communication bus without deteriorating the original performance of the communication bus.

OVERVIEW

This application discusses, among other things, communication apparatus and methods, and more particularly, a single conductor or single wire communication scheme. In an example, a method for communicating between a master device and a slave device using a first single conductor can include transmitting a first ping on the first single conductor using a master device, the first single conductor configured to couple the master device to a slave device, receiving a slave ping on the first single conductor at the master device during a ping interval, transmitting data packets from the master device to the slave device using the first single conductor, wherein transmitting data packets includes toggling a logic level of the first single conductor prior to sending a first data packet using pulses having a duration of less than one half of a unit interval, wherein the unit interval defines a single bit duration of transmitted data, and wherein a ping, including the first ping and the slave ping, includes a duration of more than a unit interval.

This section is intended to provide an overview of subject matter of the present patent application. It is not intended to provide an exclusive or exhaustive explanation of the invention. The detailed description is included to provide further information about the present patent application

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIGS. 2A-2D illustrate generally example methods for a device to pause transmission of information over a single conductor interface.

FIGS. 3A-3D illustrate generally example methods for a device to pause the interface during transmission of information over a single conductor interface using a minimum length preamble FIGS. 4A and 4B illustrate example methods of indicating an end of a command or data transmission on a single conductor interface using a calibration pulse.

FIGS. 6A and 6B illustrate generally example exchanges between a master and slave using a single conductor interface.

DETAILED DESCRIPTION

The present inventors have recognized example methods for operating and switching a single conductor interface. In certain examples, a method can more efficiently utilize conductors coupling components of an electronic device. For example, when a conductor of a multi-conductor interface is idle, a master device configured according to the present subject matter can initiate and carry on communications with a compatible slave device using just the lone conductor in a secondary function. In certain examples, when the lone conductor is again required for its primary function, the master and slave devices can execute a switch to a different conductor to continue communications. In certain examples, a single conductor communication protocol can be defined around fixed timing windows where a master component and a slave component can each take control of the single conductor bus. In some examples, the master and the slave can calibrate their receive clocks by timing a pulse width of a calibration, or ping, pulse. In certain examples, the pulse width of the calibration pulse can also be used to indicate the presence of each device on the bus as well as to indicate an end of a data or command transmission. In certain examples, a master device can have priority to the interface or single conductor bus.

In certain examples, where more than one conductor is available for single conductor communication, other conductors can be used to encode a type of master attached to the interface. In certain examples where more than one conductor is available for single conductor communication, an example protocol can switch between the conductors to continue communication, to avoid interruption of a primary function of a conductor, to provide more efficient and timely communication, or combinations thereof.

Figure 1A:
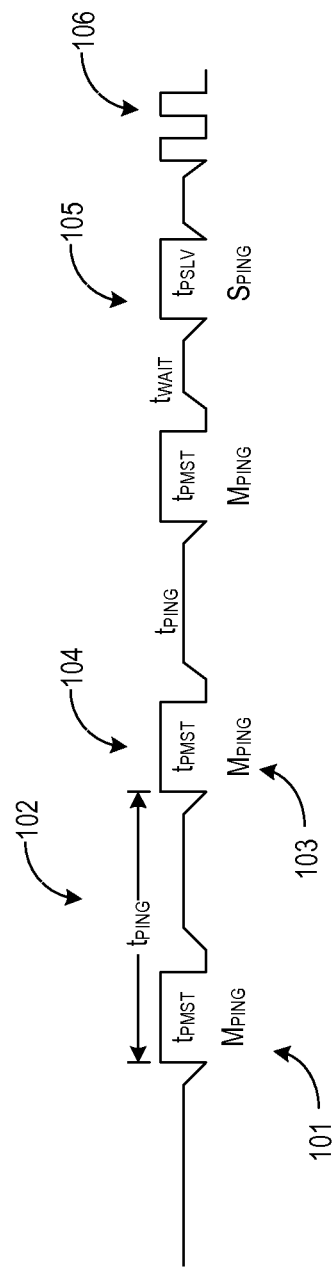
FIG. 1A illustrates generally an initial exchange between a master and a slave using an example single conductor communication method.

FIG. 1A illustrates generally an initial exchange between a master device and a slave device using an example single conductor communication method. In certain examples, the master can have priority to the interface. At 101, the master can take control of the interface and transmit a master calibration pulse or ping ($M_{PING}$) having a predetermined duration ($T_{PMST}$). At 102, the master can release control of the interface and wait for a slave to respond. In certain examples, a slave can be configured to response within a response interval ($T_{PING}$). If a slave does not respond in the response interval ($T_{PING}$), at 103, the master can wait a ping interval ($T_{PING}$) before transmitting a next master ping pulse ($M_{PING}$), at 104. If a slave is present on the interface, and receives a master ping pulse ($M_{PING}$), the slave can respond within the response interval ($T_{PING}$) with a slave calibration or ping pulse ($S_{PING}$), at 105.

In certain examples, during reception of the master ping pulse by the slave, the slave can time the duration of the master ping pulse. When the slave responds to the master ping pulse, the slave can transmit a slave ping pulse approximately equal in length to the master ping pulse. In certain example, the duration of the master and slave ping pulses can be configured such that there is less than ½ of one clock cycle of error per unit interval of each device. In certain examples, a transmitted bit length can be equal to a unit interval. In certain examples, the length of the master ping pulse can be stored in memory of the slave device to identify an end of a data transmission by the master device. In certain examples, the transmission of the slave ping pulse can be used to indicate the presence of the slave on the interface.

In certain examples, during reception of the slave ping pulse by the master, the master can time the duration of the slave ping pulse. In certain examples, the length of the slave ping pulse can be stored in memory of the master device to identify an end of a data transmission by the slave device. In certain examples, receiving a pulse having a longer duration than either the master or slave ping pulse can initiate a reset of the interface.

Referring again to FIG. 1A, in response to the slave ping pulse, the master device can take control of the interface to transmit a command. In certain examples, the master device can respond to the slave ping pulse within a predetermined response window ($T_{MREQ}$) after conclusion of the slave ping pulse. In certain examples, if the master does not respond within the master request interval ($T_{MREQ}$) after the conclusion of the slave ping pulse, the slave can request control of the bus after conclusion of a slave request window ($T_{SREQ}$) following the conclusion of the slave ping pulse. In certain examples, the slave request window interval ($T_{SREQ}$) is longer than the master response interval ($T_{MREQ}$). In certain situations, either the master device or the slave device can be required to take control of the interface but may not be ready to transmit information such as command information or data. In certain examples, a device can take control and pause the interface by transmitting a pulse train of pulses having a duration different than a bit width. In some examples, the pause pulse width duration can be a fraction of a bit width such as about a quarter of a bit width, for example. The example method illustrated generally in FIG. 1A shows at 106, the master device taking control of the interface after receiving a reply ping pulse from the slave device. In certain examples, the master device can take control of the interface by transmitting a pulse train of pause pulses. In the illustrated example, the pause pulses have a pulse width of about a quarter of a single bit pulse width. It is understood that other pause pulse widths are possible without departing from the scope of the present subject matter.

Figure 1B:
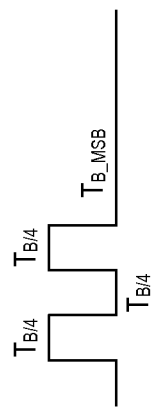
FIGS. 1B and 1C illustrate generally transmission of an initial bit of data using an example single conductor communication method.

FIG. 1B illustrates generally an example transmission of an initial bit of data using an example single conductor communication method where the initial data bit ($T_{B\_MSB}$) has a high logic level. In certain examples, the initial bit ($T_{B\_MSB}$) can be preceded by a header. In some examples, the header can include a number of pulses. Each pulse of the header can have a pulse duration that is shorter than a unit interval. In certain examples, the header pulse duration can be shorter than one half of a unit interval. In some examples, the header pulse duration can be about one quarter of a unit interval or less.

Figure 1C:
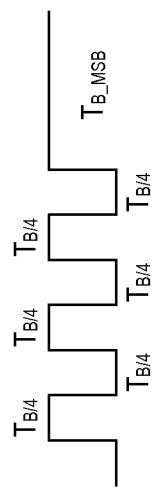

FIG. 1C illustrates generally an example transmission of an initial bit of data using an example single conductor communication method where the initial data bit ($T_{B\_MSB}$) has a low logic level. In certain examples, the initial bit ($T_{B\_MSB}$) can be preceded by a header. In some examples, the header can include a number of pulses. Each pulse of the header can have a pulse duration that is shorter than a unit interval. In certain examples, the header pulse duration can be shorter than one half of a unit interval. In some examples, the header pulse duration can be about one quarter of a unit interval or less.

FIGS. 2A-2D illustrate generally example methods for a device to pause the interface during transmission of information over a single conductor interface such as transmission of a command or data. FIG. 2A illustrates generally an example of pausing transmission between a first bit having a high logic level and a bit length ($T_B$) and a second bit having a low logic level. FIG. 2B illustrates generally an example of pausing transmission between a first bit having a low logic level and a second bit having a low logic level. FIG. 2C illustrates generally an example of pausing a transmission between a first bit having a high logic level and a second bit having a high logic level. FIG. 2D illustrate an example of pausing a transmission between a first bit having a low logic level and a second bit having a high logic level. In the illustrated examples of FIGS. 2A-2D each pause pulse includes an on-time of about one quarter of a bit length and an off time of about one quarter of a bit length ($T_{B/4}$). It is understood that other values of on-time and off-time of the pause bit are possible without departing from the scope of the present subject matter. In certain examples, the waveform formed by the pause bits can be referred to as a preamble. In certain examples, a preamble between bytes can ensure that the counts that synchronize clock domains between master and slave do not get too far apart and can reset on these preambles.

FIGS. 3A-3D illustrate generally example methods for a device to pause the interface during transmission of information over a single conductor interface using a minimum length preamble, such as pausing between bits of a transmission. In certain examples, FIGS. 3A-3D illustrate generally, preambles that can be provided between bytes of a multi-byte transmission. FIG. 3A illustrates generally an example of pausing transmission between a first bit having a high logic level and a bit length ($T_B$) and a second bit having a low logic level using a minimum length preamble. FIG. 3B illustrates generally an example of pausing transmission between a first bit having a low logic level and a second bit having a low logic level using a minimum length preamble. FIG. 3C illustrates generally an example of pausing a transmission between a first bit having a high logic level and a second bit having a high logic level using a minimum length preamble. FIG. 3D illustrate an example of pausing a transmission between a first bit having a low logic level and a second bit having a high logic level using a minimum length preamble. In the illustrated examples of FIGS. 3A-3D, each pause pulse includes an on-time of about one quarter of a bit length and an off time of about one quarter of a bit length ($T_{B/4}$). It is understood that other values of on-time and off-time of the pause bit are possible without departing from the scope of the present subject matter.

FIGS. 4A and 4B illustrate example methods of indicating an end of a command or data transmission on a single conductor interface using a calibration pulse. FIG. 4A illustrates generally an example method of ending a transmission with a bit having a low a preamble and a calibration pulse. The bit can have a bit duration of $T_B$, the preamble pause pulses can have a duration of $T_{B/4}$, and the calibration pulse can have a duration of $T_{PMST}$ or $T_{PSLV}$. FIG. 4B illustrates generally an example method of ending a transmission with a bit having a high logic level, a preamble, and a calibration pulse. The illustrated calibration pulses are shown having a high logic level, however, calibration pulses having a low logic level are possible without departing from the scope of the present subject matter.

Figure 5A:
FIGS. 5A and 5B illustrate generally example methods of resetting a single conductor interface.
Figure 5B:

FIGS. 5A and 5B illustrate example methods of resetting a single conductor interface. In certain examples, using a pulse width larger than the pulse width of a ping pulse can serve as a reset of the interface. Both the master and slave can reset the interface. Since the master device can have default control of the single conductor interface the master device can reset the single conductor interface by transmitting a reset pulse having a pulse width longer than a calibration or ping pulse. In certain example, the slave device can request that the interface be reset by first sending a reset pulse, then the master can grant the reset by transmitting a master reset pulse. FIG. 5A illustrates generally a method for the slave device to request a reset when the after a master ping pulse. After the master ping pulse, during a wait interval ($t_{WAIT}$), the slave can transmit a slave reset request that can include a reset pulse having a pulse width wider than a slave ping pulse. Upon receiving the slave reset request, the master device can transmit a master reset pulse. FIG. 5B illustrates generally an example method for a slave to request a reset of the single conductor communication interface when the slave has transmitted a slave ping pulse ($S_{PING}$). After a slave request window interval ($t_{SREQ}$) has expired after the slave ping pulse ($S_{PING}$) without the master requesting control of the single conductor, the slave can transmit the slave reset request ($S_{RESET\_REQ}$) having a pulse duration ($t_{RESET}$) linger than the duration ($t_{PSLV}$) of the slave ping pulse ($S_{PING}$). Upon receiving the slave reset request ($S_{RESET\_REQ}$), the master can send a reset pulse ($M_{RESET}$) to have the processors of the master device and the slave device simultaneously reset their respective interfaces to the single conductor. In certain examples, a slave reset request ($S_{RESET\_REQ}$) can serve as a reset and both the slave device and the master device can reset upon recognizing the duration or completion of the slave reset request ($S_{RESET\_REQ}$). In certain example, the respective transmitting device can release electrical control of the single conductor to allow the other device to request control of the single conductor or to take control of the single conductor such as during the wait periods ($t_{WAIT}$, $t_{SREQ}$) of a timing window after a transmission.

FIGS. 6A and 6B illustrate example exchanges between a master device and slave device using a single conductor interface. With regards to FIG. 6A, an exchange can include a slave device sending a ping pulse ($t_{PSLV}$), for example, to indicate the slave's presence on the interface. If the master does not respond within a certain interval, after a longer interval ($t_{SREQ}$), the slave can send command information (SCOMMAND) followed by a slave ping pulse ($t_{PSLV}$) to indicate conclusion of the command information (SCOMMAND). In certain examples, the master and the slave can exchange ping pulses according to predetermined window intervals while the master device processes the command. In some example, the master device can take control of the single conductor and generate a series of pause pulses until a response to the command has been processed and is ready to be communicated. In certain examples, the master can transmit the response information (MRESPONSE) by taking control of the single conductor during a predetermined master request window interval ($t_{MREQ}$) following a slave ping pulse ($t_{PSLV}$).

FIG. 6B illustrates generally an example method of transmitting master command information (MCOMMAND) using a single conductor communication interface. In certain examples, an exchange can include a slave device sending a ping pulse ($t_{PSLV}$) for example, to indicate the slave's presence on the interface. The master device can take control of the single conductor by beginning to send master command information (MCOMMAND) within a master request window interval ($t_{MREQ}$). The slave can respond with either a response to indicate reception of the command or response information (SRESPONSE). In certain examples, for commands that request data, the returned data can serve as acknowledgement that the command was received correctly. In certain examples, this type of acknowledgment can reduce or eliminate an additional handshake back to acknowledge the command or to acknowledge the data. In some examples, if the data returned is bad, then the requestor can retry the request. In certain examples, the requestor can retry a predetermined number of times before taking other actions or providing an indication the target device is no longer active on the interface.

In certain examples, the command information and response information can be sent in packets, such as 8-bit packets although other packet sizes are possible without departing from the scope of the present subject matter. In some examples, a packet is preceded by a number of sync or pause pulses, such as pulses having a fraction of a unit interval. In some examples, a packet can be followed by a parity bit for allowing a receiving device to determine if the packet was properly received. In some examples, a packet can include or be followed by cyclic redundancy check (CRC) information. In certain examples, a packet can include or can be followed by both a parity bit and CRC information.

Figure 7:
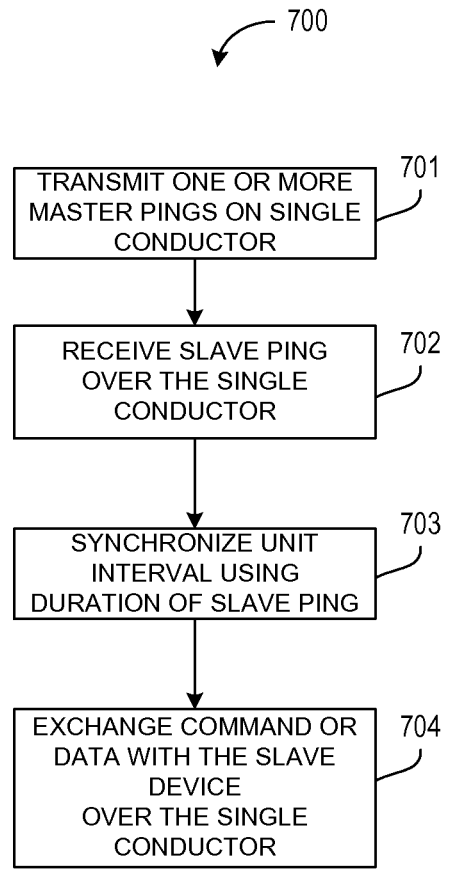
FIG. 7 illustrates generally a flowchart of an example method of initiating communications with a slave device over a single conductor interface.

FIG. 7 illustrates generally a flowchart of an example method 700 of initiating communications with a slave device over a single conductor interface. The method can include, at 701, transmitting one or more pings from a master device over the single conductor, at 702, receiving a slave ping over the single conductor, at 703, synchronizing the master clock or measuring the slave ping duration to synchronize interval durations with the slave device, such as synchronizing the duration of the unit interval such that a unit interval as measured by the master device and a unit interval as measured by the slave device do not vary by more than a half clock cycle of either device, and at 704, exchanging command or data with the slave device over the single conductor.

Figure 8:
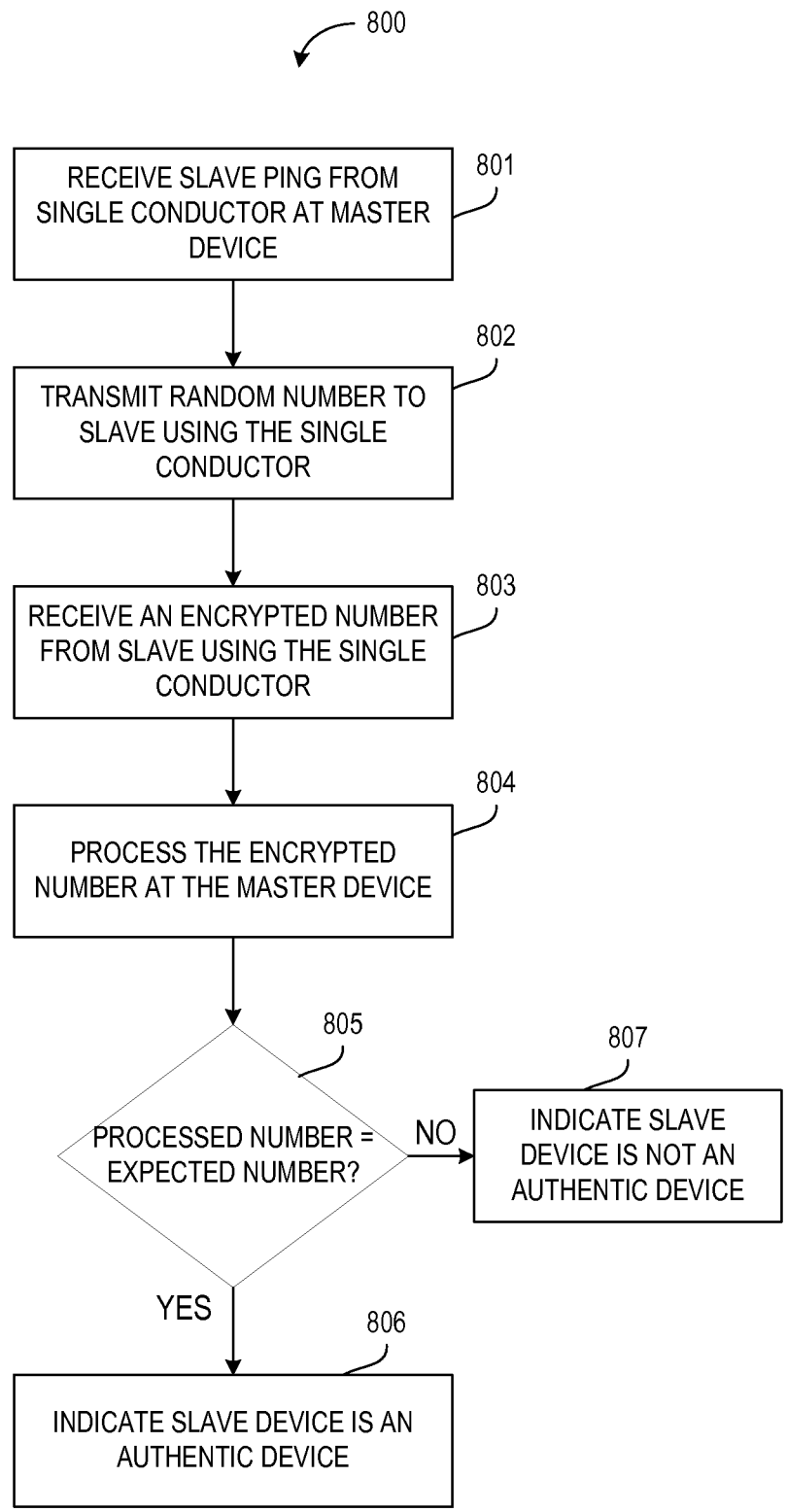
FIG. 8 illustrates generally a flowchart of an example method of authenticating a slave device over a single conductor interface.

FIG. 8 illustrates generally a flowchart of an example method 800 of authenticating a slave device over a single conductor interface. The method can include, at 801, receiving a slave ping from a single conductor at a master device, at 802, transmitting a random number or transmitting a random number and an authentication command to the slave device over the single conductor, at 803, receiving over the single conductor an encrypted number, and at 804, processing the encrypted number. In certain examples, processing the encrypted number can include, but is not limited to, passing the encrypted number to a comparator, performing further encryption including decrypting the encrypted number, or combinations thereof. At 805, the method can include comparing the processed number to an expected number, such as the random number in some examples, at the master device. If the processed number matches the expected number, the master device, at 806, can indicate that the salve device is an authentic device, for example, corresponding to slave device type identification (ID) received on a separate ID pin of the interface. If the processed number does not match the expected number, the master device, at 807, can indicate that the salve device is not an authentic device.

Figure 9:
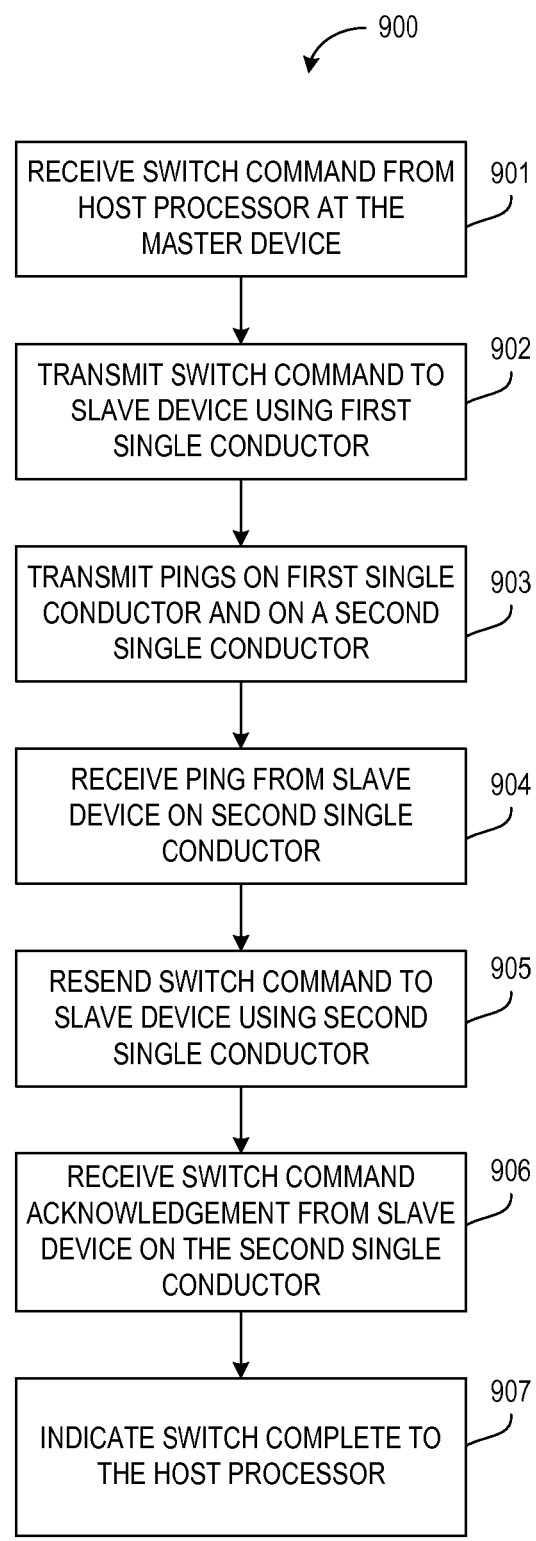
FIG. 9 illustrates generally a flowchart of an example method for switching communications with a slave device from a first single conductor to a second single conductor.

FIG. 9 illustrates generally a flowchart of an example method 900 for switching communications with a slave device from a first single conductor to a second single conductor. The method can include, at 901, receiving at a master device a switch command from a host processor. Such a command can be initiated, for example, because the host processor will be using the current conductor and a second conductor is idle. In certain examples, the conductors can be part of a multi conductor bus interface, such as, but not limited to, a Universal Serial Bus (USB) interface. At 902, the master device can transmit a switch command to a slave device using the first single conductor. In some examples, the switch command can include information about what other conductors are available for single conductor communications. In certain examples, the aster can receive an acknowledgement of the switch command from the slave. In some examples, the master can wait for an acknowledgement from the slave before proceeding with the switch method 900. In certain examples, the master device can indicate an error to a host processor if a slave device does not provide an switch command acknowledgement within a predetermined interval from transmission of the switch command. At 903, the master device can transmit master pings on the first conductor and one or more second conductors available for switching communications thereto. The method can include, at 904, receiving a slave ping on a second single conductor at the master device, at 905, resending the switch command from the master device to the slave device using the second single conductor, at 906, receiving a switch acknowledgement from a slave device on the second single conductor at the master device, and at 907, indicating, to the host processor for example, that the switch from the first single conductor to the second single conductor is complete.

Figure 10:
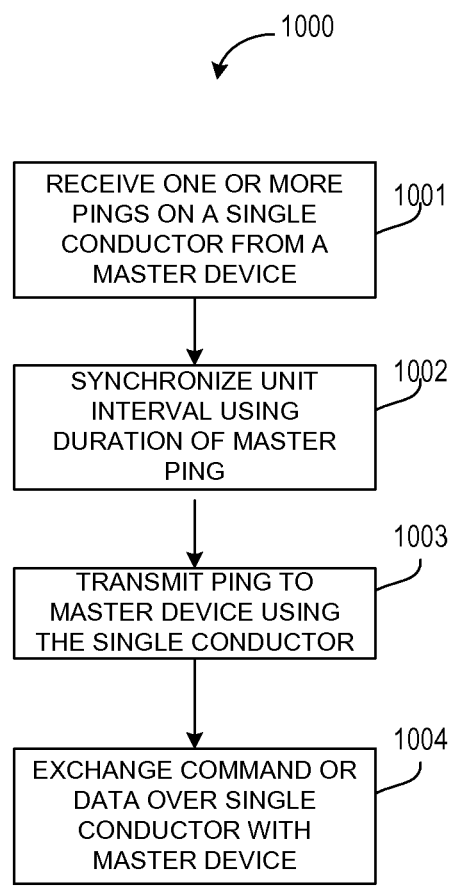
FIG. 10 illustrates generally a flowchart of an example method of initiating communications with a slave device over a single conductor interface.

FIG. 10 illustrates generally a flowchart of an example method 1000 of initiating communications with a slave device over a single conductor interface. The method can include, at 1001, receiving one or more master pings from a master device over the single conductor, at 1002, synchronizing the clock of the slave or measuring the master ping duration to synchronize interval durations with the master device, such as synchronizing the duration of the unit interval such that a unit interval as measured by the master device and a unit interval as measured by the slave device does not vary by more than a half clock cycle of either device, at 1003, transmitting a slave ping over the single conductor, and at 1004, exchanging command or data with the master device over the single conductor.

Figure 11:
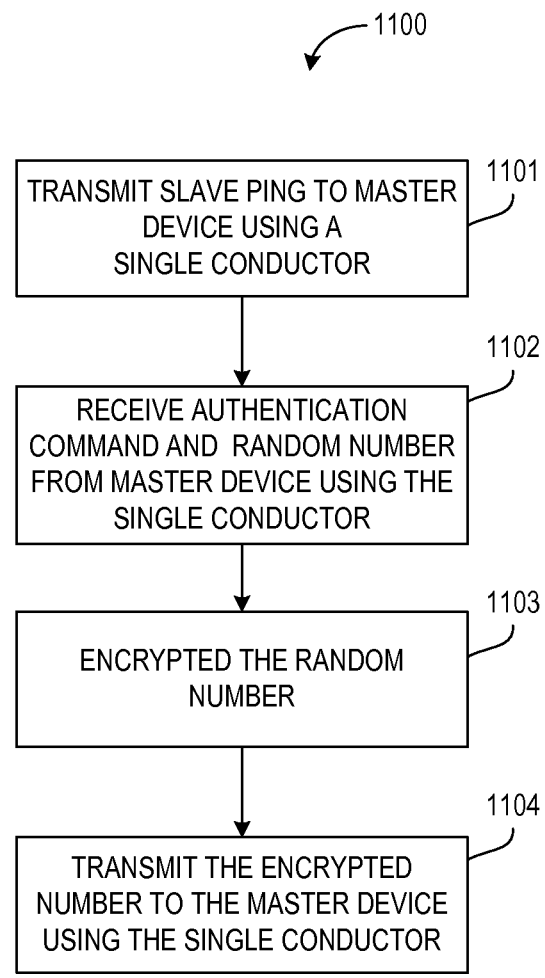
FIG. 11 illustrates generally a flowchart of an example method of authenticating a slave device over a single conductor interface.

FIG. 11 illustrates generally a flowchart of an example method 1100 of authenticating a slave device over a single conductor interface. The method can include, at 1101, transmitting a slave ping over a single conductor to a master device, at 1102, receiving a random number or receiving a random number and an authentication command from the master device over the single conductor, at 1103, encrypting the random number, and at 1104, transmitting the encrypted number over the single conductor.

Figure 12:
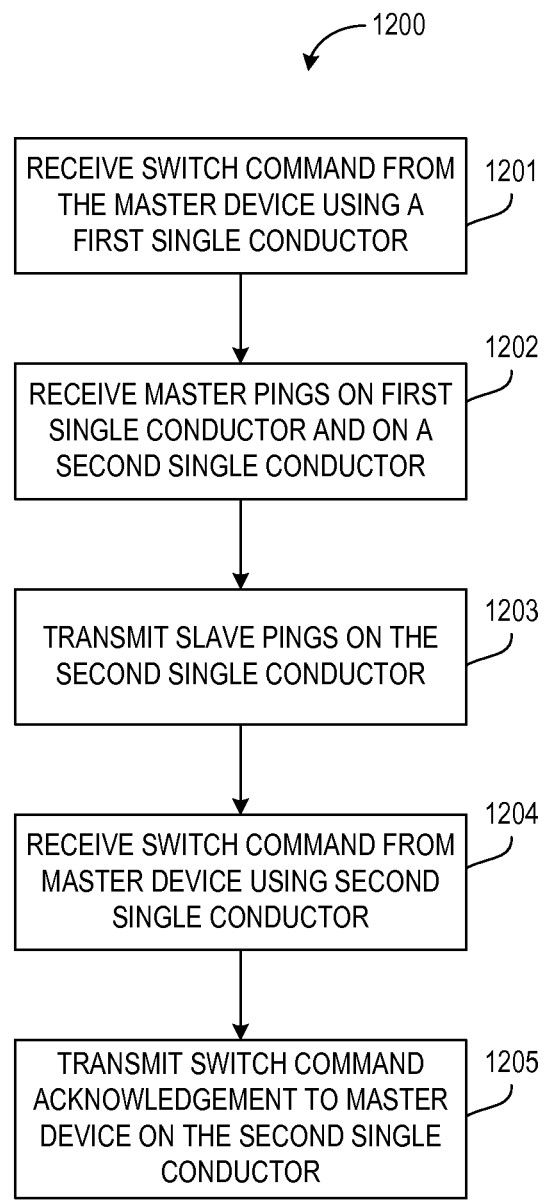
FIG. 12 illustrates generally a flowchart of an example method for switching communications with a slave device from a first single conductor to a second single conductor.

FIG. 12 illustrates generally a flowchart of an example method 1200 for switching communications with a slave device from a first single conductor to a second single conductor. The method can include, at 1201, receiving a switch command at the slave device using the first single conductor. In some examples, the switch command can include information about what other conductors are available for single conductor communications. In certain examples, the slave can transmit an acknowledgement of the switch command to the master device. At 1202, the method can include receiving master pings on the first conductor and one or more second conductors available for switching communications thereto. The method can include, at 1203, transmitting a slave ping on a second single conductor, at 1204, receiving the switch command from the master device at the slave device using the second single conductor, and at 1205, transmitting a switch acknowledgement from the slave device on the second single conductor to the master device.

In certain examples, interface optimization can be achieved by retaining last known good information such as last known good slave IDs. Saving such IDs can improve authentication timing of a single conductor interface. In some examples, the calibration pulse handshake between the master and the slave can be used to also denote the presence of the master and slave on the interface. In certain examples, a method can include fixed windows for master transaction starts, slave transaction starts, and slave responses such as slave calibration responses. In some examples, a method can include provisions for pausing the interface during communication, such as pausing during a first response window, and using a preamble to pause the interface between data transfers. In certain examples, other conductors can be used to encode the type of master coupled to a interface. In some examples, slave devices can access the encoded data via the other conductors.

Additional Notes

In Example 1, a method for communicating between a master device and a slave device using a first single conductor can include transmitting a first ping on the first single conductor using a master device, the first single conductor configured to couple the master device to a slave device, receiving a slave ping on the first single conductor at the master device during a ping interval, transmitting data packets from the master device to the slave device using the first single conductor, wherein transmitting data packets includes toggling a logic level of the first single conductor prior to sending a first data packet using pulses having a duration of less than one half of a unit interval, wherein the unit interval defines a single bit duration of transmitted data, and wherein a ping, including the first ping and the slave ping, includes a duration of more than a unit interval.

In Example 2, the transmitting the master ping of Example 1 optionally includes releasing electrical control of the first single conductor, and waiting to receive the slave ping during the ping interval.

In Example 3, the transmitting data packets of any one or more of Examples 1-2 optionally includes transmitting multi-byte data packets.

In Example 4, the transmitting multi-byte data packets of any one or more of Examples 1-3 optionally includes transmitting a plurality of bytes, wherein each byte includes a plurality of data bits and a parity bit.

In Example 5, the transmitting data packets of any one or more of Examples 1-4 optionally includes transmitting an end-of-packet ping to indicate an end of each packet of the data packets.

In Example 6, the method of any one or more of Examples 1-5 optionally includes authenticating the slave device after receiving the slave ping.

In Example 7, the authenticating of any one or more of Examples 1-6 optionally includes transmitting a random number from the master to the slave, receiving an encrypted number from the slave, decrypting or further encrypting the encrypted number to provide a decrypted or processed number, and indicating a valid authentication if the decrypted or processed number matches the random number.

In Example 8, the method of any one or more of Examples 1-7 optionally includes switching communications from the first single conductor to a second single conductor.

In Example 9, the switching of any one or more of Examples 1-8 optionally includes receiving a switch command from a host processor at the master device, transmitting a switch command to the slave using the first single conductor, transmitting master pings using the first single conductor and the second single conductor, and receiving a second slave ping on the second single conductor.

In Example 10, the switching of any one or more of Examples 1-9 optionally includes resending switch command to the slave device using the second single conductor, receiving a switch acknowledgement from the slave using the second single conductor, and transmitting an interrupt to the host device indicating completion of a communication switch from the first single conductor to the second single conductor.

In Example 11, the method of any one or more of Examples 1-10 optionally includes resetting communications between the master device and the slave device, wherein the resetting includes transmitting a reset pulse over the single conductor using the master device, and wherein the reset pulse includes a duration longer than a duration of the master ping.

In Example 12, the reset pulse of any one or more of Examples 1-11 optionally has a duration more than five times longer than the duration of the master ping.

In Example 13, the master ping of any one or more of Examples 1-12 optionally includes a duration that is more than ten times longer than the unit interval.

In Example 14, a method for communicating between a master device and a slave device using a first single conductor can include receiving a first master ping at a slave device using the first single conductor, transmitting a first slave ping from the slave device using the first single conductor, and receiving data packets from the master device at the slave device using the first single conductor, wherein receiving data packets includes receiving a plurality of pulses having a duration of less than one half of a unit interval, wherein the unit interval defines a single bit duration of transmitted data.

In Example 15, the transmitting a first slave ping of any one or more of Examples 1-14 optionally includes releasing the electrical control of the first single conductor and delaying at least one unit interval before detecting the master electrically controlling the first single conductor.

In Example 16, the transmitting a first slave ping of any one or more of Examples 1-15 optionally includes releasing the electrical control of the first single conductor, and wherein the method includes delaying between three unit intervals and five unit intervals before taking control of the first single conductor to send slave information to the master using the first single conductor.

In Example 17, the method of any one or more of Examples 1-16 optionally includes transmitting slave data packets to the master device using the first single conductor.

In Example 18, the transmitting slave data packets of any one or more of Examples 1-17 optionally includes transmitting an end-of-packet ping to indicate an end of each packet of the slave data packets.

In Example 19, the method of any one or more of Examples 1-18 optionally includes receiving an authentication command and a random number from the master at the slave device using the first single conductor, encrypting the random number to provide an encrypted number, and transmitting the encrypted number to the master using the first single conductor.

In Example 20, the method of any one or more of Examples 1-19 optionally includes receiving a switch command from the master device at the slave device using the first single conductor, transmitting a first switch command acknowledgement from the slave device to the master device using the first single conductor, receiving master pings on both the first single conductor and a second single conductor at the slave device, transmitting a second slave ping on the second single conductor in response to one or more master pings received on the second single conductor, receiving a copy of the switch command on the second single conductor at the slave device, and transmitting a second switch command acknowledgement from the slave device to the master device using the second single conductor.

In Example 21, a transceiver for communicating over a single conductor can include a processor configured to transmit a first ping on a first single conductor, the first single conductor configured to couple the transceiver with a slave device, to receive a slave ping on the first single conductor during a ping interval, to transmit data packets to the slave device using the first single conductor, to toggle a logic level of the first single conductor prior to sending a first data packet using pulses having a duration of less than one half of a unit interval, wherein the unit interval defines a single bit duration of transmitted data, and wherein a ping, including the first ping and the slave ping, includes a duration of more than a unit interval.

In Example 22, the processor of any one or more of Examples 1-21 optionally is configured to transmit a random number to the slave; to receive an encrypted number from the slave, to decrypt the encrypted number to provide a decrypted number, and to indicate a valid authentication of the slave if the decrypted number matches the random number.

In Example 23, a transceiver for communicating over a single conductor can include a processor configured to receive a first master ping from a master device coupled to the first single conductor, to transmit a first slave ping on the first single conductor in response to the master ping, to receive data packets from the master device using the first single conductor, and to receive a plurality of pulses having a duration of less than one half of a unit interval immediately prior to receiving each data packet of the data packets, wherein the unit interval defines a single bit duration of transmitted data.

In Example 24, the processor of any one or more of Examples 1-23 optionally is configured receive an authentication command and a random number from the master using the first single conductor, to encrypt the random number to provide an encrypted number, and to transmit the encrypted number to the master using the first single conductor.

In Example 25, the processor of any one or more of Examples 1-24 optionally is configured to receive a switch command from the master device using the first single conductor, to transmit a first switch command acknowledgement to the master device using the first single conductor, to receive master pings on both the first single conductor and a second single conductor, to transmit a second slave ping on the second single conductor in response to one or more master pings received on the second single conductor, to receive a copy of the switch command on the second single conductor, and to transmit a second switch command acknowledgement to the master device using the second single conductor.

Example 26 can include, or can optionally be combined with any portion or combination of any portions of any one or more of Examples 1 through 25 to include, subject matter that can include means for performing any one or more of the functions of Examples 1 through 25, or a machine-readable medium including instructions that, when performed by a machine, cause the machine to perform any one or more of the functions of Examples 1 through 25.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A method for communicating between a master device and a slave device using a first single conductor, the method comprising:
    transmitting a first ping on the first single conductor using a master device, the first single conductor configured to couple the master device to a slave device;
    receiving a slave ping on the first single conductor at the master device during a ping interval;
    authenticating the slave device after receiving the slave ping, wherein the authenticating includes:
    transmitting a random number from the master to the slave;
    receiving an encrypted number from the slave;
    decrypting the encrypted number to provide a decrypted number; and
    indicating a valid authentication if the decrypted number matches the random number;
    transmitting data packets from the master device to the slave device using the first single conductor, wherein transmitting data packets includes toggling a logic level of the first single conductor prior to sending a first data packet using pulses having a duration of less than one half of a unit interval, wherein the unit interval defines a single bit duration of transmitted data; and wherein a ping, including the first ping and the slave ping, includes a duration of more than a unit interval.

2. The method of claim 1, wherein the transmitting the master ping includes releasing electrical control of the first single conductor; and waiting to receive the slave ping during the ping interval.

3. The method of claim 1, wherein the transmitting data packets includes transmitting multi-byte data packets.

4. The method of claim 3, wherein transmitting multi-byte data packets includes transmitting a plurality of bytes, wherein each byte includes a plurality of data bits and a parity bit.

5. The method of claim 1, wherein transmitting data packets includes transmitting an end-of-packet ping to indicate an end of each packet of the data packets.

6. The method of claim 1, including switching communications from the first single conductor to a second single conductor.

7. The method of claim 6, wherein the switching includes:
receiving a switch command from a host processor at the master device;
transmitting a switch command to the slave using the first single conductor;
transmitting master pings using the first single conductor and the second single conductor; and
receiving a second slave ping on the second single conductor.

8. The method of claim 7, wherein switching includes:
resending switch command to the slave device using the second single conductor;
receiving a switch acknowledgement from the slave using the second single conductor; and
transmitting an interrupt to the host device indicating completion of a communication switch from the first single conductor to the second single conductor.

9. The method of claim 1, including resetting communications between the master device and the slave device;
wherein the resetting includes transmitting a reset pulse over the single conductor using the master device; and
wherein the reset pulse includes a duration longer than a duration of the master ping.

10. The method of claim 9, wherein the reset pulse has a duration more than five times longer than the duration of the master ping.

11. The method of claim 1, wherein the master ping includes a duration that is more than ten times longer than the unit interval.

12. A method for communicating between a master device and a slave device using a first single conductor; the method comprising:
receiving a first master ping at a slave device using the first single conductor;
transmitting a first slave ping from the slave device using the first single conductor;
receiving an authentication command and a random number from the master at the slave device using the first single conductor;
encrypting the random number to provide an encrypted number; and
transmitting the encrypted number to the master using the first single conductor; and receiving data packets from the master device at the slave device using the first single conductor, wherein receiving data packets includes receiving a plurality of pulses having a duration of less than one half of a unit interval, wherein the unit interval defines a single bit duration of transmitted data.

13. The method of claim 12, wherein transmitting a first slave ping includes releasing the electrical control of the first single conductor and delaying at least one unit interval before detecting the master electrically controlling the first single conductor.

14. The method of claim 12, wherein transmitting a first slave ping includes releasing the electrical control of the first single conductor; and
wherein the method includes delaying between three unit intervals and five unit intervals before taking control of the first single conductor to send slave information to the master using the first single conductor.

15. The method of claim 12, including transmitting slave data packets to the master device using the first single conductor.

16. The method of claim 15, wherein transmitting slave data packets includes transmitting an end-of-packet ping to indicate an end of each packet of the slave data packets.

17. The method of claim 12, including receiving a switch command from the master device at the slave device using the first single conductor;
transmitting a first switch command acknowledgement from the slave device to the master device using the first single conductor;
receiving master pings on both the first single conductor and a second single conductor at the slave device;
transmitting a second slave ping on the second single conductor in response to one or more master pings received on the second single conductor;
receiving a copy of the switch command on the second single conductor at the slave device; and
transmitting a second switch command acknowledgement from the slave device to the master device using the second single conductor.

18. A transceiver for communicating over a single conductor, the transceiver comprising:
a processor configured to transmit a first ping on a first single conductor, the first single conductor configured to couple the transceiver with a slave device, to receive a slave ping on the first single conductor during a ping interval, to transmit data packets to the slave device using the first single conductor, to toggle a logic level of the first single conductor prior to sending a first data packet using pulses having a duration of less than one half of a unit interval, wherein the unit interval defines a single bit duration of transmitted data, and wherein a ping, including the first ping and the slave ping, includes a duration of more than a unit interval; and
wherein the processor is further configured to transmit a random number to the slave, to receive an encrypted number from the slave, to decrypt the encrypted number to provide a decrypted number, and to indicate a valid authentication of the slave if the decrypted number matches the random number.

19. A transceiver for communicating over a single conductor, the transceiver comprising:
a processor configured to receive a first master ping from a master device coupled to the first single conductor, to transmit a first slave ping on the first single conductor in response to the master ping, to receive data packets from the master device using the first single conductor, and to receive a plurality of pulses having a duration of less than one half of a unit interval immediately prior to receiving each data packet of the data packets, wherein the unit interval defines a single bit duration of transmitted data; and wherein the processor is further configured receive an authentication command and a random number from the master using the first single conductor, to encrypt the random number to provide an encrypted number, and to transmit the encrypted number to the master using the first single conductor.

20. A transceiver for communicating over a single conductor, the transceiver comprising:

a processor configured to receive a first master ping from a master device coupled to the first single conductor, to transmit a first slave ping on the first single conductor in response to the master ping, to receive data packets from the master device using the first single conductor, and to receive a plurality of pulses having a duration of less than one half of a unit interval immediately prior to receiving each data packet of the data packets, wherein the unit interval defines a single bit duration of transmitted data; and wherein the processor is further configured to receive a switch command from the master device using the first single conductor, to transmit a first switch command acknowledgement to the master device using the first single conductor, to receive master pings on both the first single conductor and a second single conductor, to transmit a second slave ping on the second single conductor in response to one or more master pings received on the second single conductor, to receive a copy of the switch command on the second single conductor, and to transmit a second switch command acknowledgement to the master device using the second single conductor.

21. A method for communicating between a master device and a slave device using a first single conductor, the method comprising:

transmitting a first ping on the first single conductor using a master device, the first single conductor configured to couple the master device to a slave device;

receiving a slave ping on the first single conductor at the master device during a ping interval;

transmitting data packets from the master device to the slave device using the first single conductor, wherein transmitting data packets includes toggling a logic level of the first single conductor prior to sending a first data packet using pulses having a duration of less than one half of a unit interval, wherein the unit interval defines a single bit duration of transmitted data; and switching communications from the first single conductor to a second single conductor;

wherein a ping, including the first ping and the slave ping, includes a duration of more than a unit interval; and wherein the switching includes:
receiving a switch command from a host processor at the master device;
transmitting a switch command to the slave using the first single conductor;
transmitting master pings using the first single conductor and the second single conductor; and
receiving a second slave ping on the second single conductor.

22. A method for communicating between a master device and a slave device using a first single conductor, the method comprising:

receiving a first master ping at a slave device using the first single conductor;

transmitting a first slave ping from the slave device using the first single conductor;

receiving data packets from the master device at the slave device using the first single conductor, wherein receiving data packets includes receiving a plurality of pulses having a duration of less than one half of a unit interval, wherein the unit interval defines a single bit duration of transmitted data;

receiving a switch command from the master device at the slave device using the first single conductor;

transmitting a first switch command acknowledgement from the slave device to the master device using the first single conductor;

receiving master pings on both the first single conductor and a second single conductor at the slave device;

transmitting a second slave ping on the second single conductor in response to one or more master pings received on the second single conductor;

receiving a copy of the switch command on the second single conductor at the slave device; and transmitting a second switch command acknowledgement from the slave device to the master device using the second single conductor.

* * * * *